Figure 1:
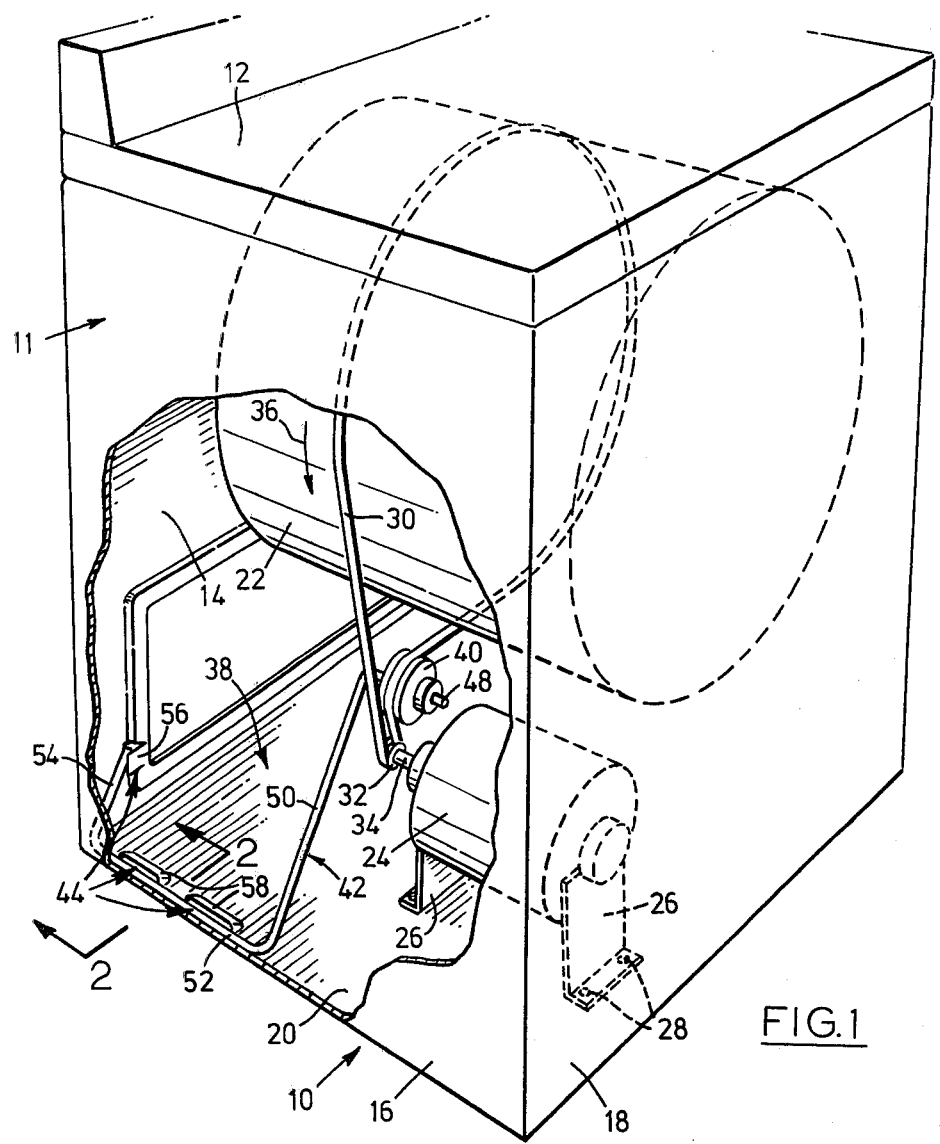

United States Patent [19]

Gladysz

[11] 4,300,293
[45] Nov. 17, 1981

[54] BELT TENSIONING ASSEMBLY FOR A CLOTHES DRYER

[75] Inventor: Victor Gladysz, Verdun, Canada

[73] Assignee: Canadian Appliance Manufacturing Company Limited, Weston, Canada

[21] Appl. No.: 135,135

[22] Filed: Mar. 28, 1980

[30] Foreign Application Priority Data

Jun. 1, 1979 [CA] Canada .................................. 328977

[51] Int. Cl.³ ............................................ F26B 25/02
[52] U.S. Cl. ...................................... 34/108; 34/133; 474/117; 474/118
[58] Field of Search .................. 34/108, 133; 474/117, 474/118

[56] References Cited

U.S. PATENT DOCUMENTS 3,890,719 6/1975 Braga et al. .............................. 34/43
4,033,047 7/1977 Kawai .................................... 34/133
4,123,851 11/1978 Itoh et al. .............................. 34/133

FOREIGN PATENT DOCUMENTS 643115 6/1962 Canada .

*Primary Examiner*—Larry I. Schwartz
*Attorney, Agent, or Firm*—Raymond A. Eckersley

[57] ABSTRACT

A belt tensioning assembling for use in a clothes dryer positions a drive belt in tensioned relation about a rotatable drum and a drive pulley mounted within the dryer housing. The belt tensioning assembly includes an idler pulley and a resilient mounting bar. The mounting bar is preferably pre-stressed to maintain the belt in aligned tensioned relation about the pulleys. The mounting bar includes a torsion arm member, a moment arm member, and a cantilevered positioning arm member onto which the idler pulley is rotatably mounted. The moment member joins one end of the positioning member to one end of the torsion member. The torsion member is secured in positioned load transfer relation with the housing. This locates the positioning member in predetermined spaced relation to the main axis of the drive pulley so that the idler pulley may be mounted thereon. Once mounted, the idler pulley may be moved to receive the belt thereover so as to provide tension thereto. In this position the idler pulley and drive pulley are substantially positioned in mutually aligned and parallel relation. Previous belt tensioning assemblies include mounting supports for the idler pulley having many separate components taking on a relatively more complex and expensive construction than that of the mounting bar of the present assembly.

10 Claims, 3 Drawing Figures

U.S. Patent    Nov. 17, 1981    4,300,293

BELT TENSIONING ASSEMBLY FOR A CLOTHES DRYER

This invention relates to a belt tensioning assembly used in a clothes dryer for providing tension to a drive belt. In particular, it concerns a belt tensioning assembly employing one idler pulley and a resilient mounting bar of simple construction.

Belt tensioning assemblies are employed in clothes dryers to provide tension to an endless drive belt which is entrained about a drive pulley and a rotatably dryer drum. The belt tensioning assembly provides sufficient tension to the belt so that various wash loads tumbled in the drum do not produce belt slippage. Belt tensioning assemblies often have some degree of resiliency allowing them to compensate for belt expansion which results from extended belt use. It is important that belt slippage be prevented, as it results in early belt wear. Belt wear leads to belt cut-through which brings the operation of the dryer to a halt until the broken belt is replaced.

Previous belt tensioning assemblies have included one or more idler pulleys mounted on various support members. It will be appreciated that the more complex the construction of the assembly becomes the more expensive the cost of manufacture and parts becomes. U.S. Pat. No. 3,890,719 issued in June 24, 1975 to Braga et al discloses a belt tensioning assembly employed in a clothes dryer. This patent shows an idler pulley supported by a support member that has two mutually extending arms, holding between them at one end thereof, a bearing upon which the idler pulley rotates. The arms are joined at their respective other ends to a resilient bracket secured to the dryer housing floor. The bearing requires support at each of its ends by the two arms. The bearing, two mutual arms, and the resilient bracket are all separate components of the support member and must be assembled either prior to or during the actual assembly of the dryer. The assemblage of these components forms a portion of the total cost of dryer manufacture and, if eliminated, would result in realizable cost savings.

It is therefore an object of this invention to provide a belt tensioning assembly of simplified construction for use in a clothes dryer.

It is also another, object of this invention to provide a positioning arm of cantilevered construction upon which an idler pulley is rotatably mounted, wherein the arm need only be supported at one of its ends.

Briefly, these objects of the invention may be provided for in a clothes dryer by a belt tensioning assembly that includes an idler pulley and a resilient mounting bar. The mounting bar may be pre-stressed to maintain a drive belt in aligned tensioned relation about the idler pulley and a drive pulley mounted within the dryer housing. The mounting bar includes a torsion arm member, a moment arm member, and a cantilevered positioned arm member onto which the idler pulley is rotatably mounted. The moment member joins one end of the positioning member to one end of the torsion member. The torsion member is secured or anchored to the dryer housing which precludes rotational displacement of the torsion member about its longitudinal axis. When secured, the torsion member is in positioned load transfer relation with the housing to locate the positioning member in predetermined spaced relation to the main axis of the drive pulley. When the mounting bar is in this position, the idler pulley may be mounted on the positioning member. Displacement of the idler pulley towards a drive pulley mounted in the housing permits the idler pulley to receive the drive belt in tensioned supported relation thereover. With the drive belt passing over the idler pulley, the idler pulley is substantially positioned in mutually aligned and parallel relation with the drive pulley. The significance of the present belt tensioning assembly lies in its simplicity and effectiveness. It comprises only one idler pulley and one mounting bar which may be unipartitely formed from a bar of uniform thickness. The present belt tensioning assembly may be quickly assemblied in the dryer for relatively low costs both in labour and material.

In accordance with an aspect of this invention there is provided in a clothes dryer a belt tensioning assembly for positioning a drive belt in tensioned relation about a rotatable drum and a drive pulley mounted within the housing of the dryer. The belt tensioning assembly comprises: an idler pulley operable in guiding and tensioning relation with the belt; a resilient mounting bar including a cantilevered positioning arm member onto which the idler pulley is rotatably mounted and a moment arm member connecting one end of the positioning member to one end of the torsion member; anchor means securing the torsion member is positioned load transfer relation with the housing to locate the positioning member in predetermined spaced relation to the main axis of the drive pulley, for mounting the idler pulley thereon, whereby upon displacement of the idler pulley, towards the drive pulley to receive the belt in tensioned supported relation over the idler pulley, the idler pulley is substantially positioned in mutually aligned and parallel relation with the drive pulley and, said mounting bar is pre-stressed to maintain the belt in aligned tensioned relation about the pulleys.

Figure 2:
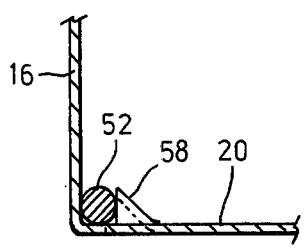
Figure 3:
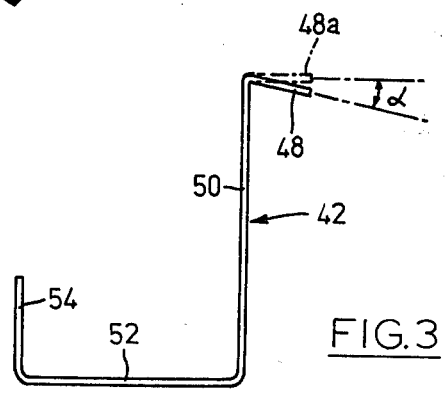

For a better understanding of the nature and objects of the invention reference may be had, by way of example, to the accompanying diagrammatic drawings in which:

FIG. 1 is an issosemetric view showing a clothes dryer employing the belt tensioning assembly of this invention, FIG. 2 is a sectional view along line 2—2 of FIG. 1 showing the torsional arm member of the resilient mounting bar in position with the dryer housing, and FIG. 3 is a side view showing the mounting bar having an angularily canted positioning arm.

Referring now to FIGS. 1 and 2, the preferred embodiment of the invention is now described. A clothes dryer 10 is shown having housing 11. Housing 11 includes a top portion 12, a back panel 14, two side panels 16 (only one of which is shown), a front panel 18 and a bottom panel or base 20. Dryer 10 has housed therein a fabric treatment or drying container for tumbling clothes, in the form of rotatable drum 22 extending axially from back panel 14. A drive motor 24 is mounted on motor brackets 26. Brackets 26 are secured to base 20 of housing 11 in a suitable manner such as bolts 28. Drive motor 24 rotatably drives drum 22 by a tensioned transmission member, in this instance, a tensioned drive belt 30. Drive belt 30 extends around the periphery of drum 22 in frictional engaged relation therewith. Drive belt 30 also extends or wraps about drive pulley 32 which is mounted to one end of motor shaft 34. Hence drive belt 30 is entrained about drum 20 and drive pulley 32 for travel in the direction indicated by arrow 36.

Tension is provided to belt 30 by a belt tensioning assembly generally indicated at 38. The assembly includes an idler pulley 40 operable in guiding and tensioning relation with belt 30, a resilient mounting bar 42 having a cantilevered positioning arm 48 upon which idler pulley 40 is rotatably mounted, and an anchor means 44 for securing mounting bar 42 to dryer housing 11. Mounting bar 42 is pre-stressed to maintain drive belt 30 in aligned tensioned relation about idler pulley 40 and drive pulley 32. Mounting bar 42 includes a moment arm member 50 connecting one end of positioning member 48 to one end of torsion arm member 52, and, in this instance, an anchor member 54 joined to the other end of torsion member 52. Moment member 50 is in torque imposing relation with torsion member 52. The anchor member 54 is cantilevered and inclined from torsion member 52 in torque restraining relation thereto. From FIG. 1 it should be evident that each member is angled from its ajoining member by an angle of about 90° whereby the torsion member 52 is substantially in parallel relation with the positioning arm 48, and the anchor member 44 and the moment member 50 lie in generally parallel planes. It is to be understood that these parallel features are characteristic of the preferred embodiment and need not be employed in alternate embodiments. The anchor means 44 includes a tab 56 attached to front panel 14 overlapping an end portion of anchor member 54 and a positioning means, in this instance spurs 58 extending from base 20, to trap torsion member 52 in positioned relation with side panel 16 and base 20 of dryer housing 11 (see FIG. 2). The anchor means 44 secure torsion member 52 in positioned load transfer relation with housing 11. This locates the positioning member 48 in predetermined spaced relation to the main axis of drive pulley 32, i.e., shaft 34. This predetermined relation is such that it allows idler pulley 40 to be mounted on positioning member 48 and it substantially positions the idler pulley 40 in aligned and parallel relation to drive pulley 32 when drive belt 30 is in tensioned supported relation over idler pulley 40 as shown in FIG. 1.

In dryer operation idler pulley 40 takes up any slack in drive belt 30. The tension provided by idler pulley 40 to belt 30 is determined by the resiliency of prestressed mounting bar 42. The resiliency of mounting bar 42 compensates for changes in bias load from belt 30 acting on idler pulley 40. As belt 30 slackens with extended use, the resiliency of mounting bar 42 allows idler pulley 40 to move along an arc back towards side panel 16 to take up the slack. Due to the pre-stressed angular canting of positioning member 48 idler pulley 40 may move slightly out of alignment with drive pulley 32. However, by allowing idler pulley 40 to be slidable along positioning member 48 the idler pulley 40 will substantially re-align itself with drive pulley 32. It should be understood that in taking up the slack in belt 30 the degree of wrap by belt 30 around drive pulley 32 increases the surface of drive pulley 32 coming into frictional contact with belt 30.

Mounting bar 42 is of unipartite construction from spring steel, or a like material. Preferably bar 42 is hard, polished and has a galvanized coating of chrome or nickel. The bar is preferably constructed from a material having a uniform circular cross-sectional area so that each member is of uniform cross-sectional area.

It should be understood that in operation drive belt 30 and idler pulley 40 exert a twisting action on moment arm member 50. If the pre-stressed mounting bar does not provide sufficient inertia to overcome this twisting action then the cantilevered positioning arm 48 may have to be angularity canted so that pulleys 32 and 40 are maintained substantially in mutual alignment during operation. Referring now to FIG. 3 there is shown a side view of a mounting bar 42 having its positioning arm 48 canted by an angular amount, α, from its operational position shown by dotted positioning arm 48a. The angular amount, α, may be in the order of about 2 degrees.

It will be appreciated that alternate embodiments may be apparent to a man skilled in the art in light of the disclosure. Such alternate embodiments may include, for example, mounting bars not including the anchor member and having the torsion member secured to the dryer.

What I claim as new and desire to secure by Letters Patent of the United States is:

1. In a clothes dryer employing a belt tensioning assembly for positioning a drive belt in tensioned relation about a rotatable drum and a drive pulley mounted within the housing of the dryer, said belt tensioning assembly comprising:

an idler pulley operable in guiding and tensioning relation with said belt;

a resilient mounting bar including a cantilevered positioning arm member onto which said idler pulley is rotatably mounted, a moment arm member connecting one end of said positioning member to one end of a torsion arm member, said moment arm member being connected in torque imposing relation with said torsion arm member, and a cantilevered anchor member inclined from said torsion member at an end opposite the one end of the torsion member in torque restraining relation thereto;

anchor means securing said torsion member and said anchor member in positioned load transfer relation with said housing to locate said positioning member in predetermined spaced relation to the main axis of said drive pulley, for mounting said idler pulley thereon, whereby upon displacement of said idler pulley towards said drive pulley to receive said belt in tensioned supported relation over said idler pulley, said idler pulley is substantially positioned in mutually aligned and parallel relation with said drive pulley; and said mounting bar is pre-stressed to maintain said belt in aligned tensioned relation about said pulleys.

2. The clothes dryer of claim 1 wherein said positioning member located in predetermined spaced relation is angularily canted from the main axis whereby said belt in tensioned supported relation over said drive pulley substantially counteracts the angular canting.

3. The clothes dryer of claim 1 wherein said torsion arm member is substantially in parallel with said positioning arm member when said belt is in tensioned supported relation over said idler pulley.

4. The clothes dryer of claim 3 wherein said anchor member and said moment member lie generally in parallel planes.

5. The clothes dryer of claim 1 wherein each member of the mounting bar is angled from its adjoining member by an angle of about 90 degrees.

6. The clothes dryer of claim 1 wherein said mounting bar is of unipartite construction.

7. The clothes dryer of claim 6 wherein said mounting bar is spring steel coated with a material selected from the group consisting of chrome and nickel.

8. The clothes dryer of claim 1 wherein said anchor means includes a tab member attached to said dryer which overlaps an end portion of said anchor member, and positioning means to trap said torsion member in positioned relation with said housing.

9. The clothes dryer of claim 8 wherein said idler pulley is slidable along said positioning arm member.

10. The clothes dryer of claim 8 wherein said positioning means includes a side portion of the dryer and at least one spur extending up from a base portion of the dryer.

* * * * *